US009898527B2

(12) United States Patent
Kumar

(10) Patent No.: US 9,898,527 B2
(45) Date of Patent: Feb. 20, 2018

(54) METHODS FOR RETRIEVING INFORMATION AND DEVICES THEREOF

(71) Applicant: Wipro Limited, Bangalore (IN)

(72) Inventor: Shishir Kumar, Patna (IN)

(73) Assignee: Wipro Limited, Bangalore (IN)

( * ) Notice: Subject to any disclaimer, the term of this patent is extended or adjusted under 35 U.S.C. 154(b) by 386 days.

(21) Appl. No.: 14/271,014

(22) Filed: May 6, 2014

(65) Prior Publication Data
US 2015/0269262 A1    Sep. 24, 2015

(30) Foreign Application Priority Data

Mar. 24, 2014   (IN) .......................... 1530/CHE/2014

(51) Int. Cl.
G06F 17/30    (2006.01)

(52) U.S. Cl.
CPC .............. *G06F 17/30672* (2013.01)

(58) Field of Classification Search
CPC ........ G06F 17/30672; G06F 17/3087
See application file for complete search history.

(56) References Cited

U.S. PATENT DOCUMENTS

| | | | | |
|---|---|---|---|---|
| 5,768,580 | A | * | 6/1998 | Wical ............... G06F 17/27 |
| 6,675,159 | B1 | * | 1/2004 | Lin .................. G06F 17/2705 |
| 8,612,208 | B2 | | 12/2013 | Cooper et al. |
| 8,620,890 | B2 | | 12/2013 | Bennett et al. |
| 8,626,509 | B2 | | 1/2014 | Roy et al. |
| 8,626,692 | B2 | | 1/2014 | Bauer et al. |
| 8,626,836 | B2 | | 1/2014 | Dawson et al. |
| 8,627,222 | B2 | | 1/2014 | Hartwell et al. |

(Continued)

*Primary Examiner* — Robert Beausoleil, Jr.
*Assistant Examiner* — Nirav K Khakhar
(74) *Attorney, Agent, or Firm* — LeClairRyan, a Professional Corporation

(57) ABSTRACT

A method for retrieving information includes determining, by the information retrieval management computing device, when an identified subject of interest in a received query maps to one of one or more ontology entities. An identification is made, by the information retrieval management computing device, when the identified subject of interest is one of one or more existing subjects of interest when the identified subject of interest is determined to map to one of the ontology entities. One or more filters associated with the identified subject of interest are stored by the information retrieval management computing device. The one or more filters include: one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or the one or more new property conditions and the one or more ontology property conditions when the identified subject of interest is not identified as one of the existing subjects of interest. An updated query is automatically built based on the stored one or more filters by the information retrieval management computing device. One or more results are retrieved and provided, by the information retrieval management computing device, based on the automatically built updated query.

17 Claims, 4 Drawing Sheets

(56) References Cited

U.S. PATENT DOCUMENTS

| | | | |
|---|---|---|---|
| 8,700,620 B1* | 4/2014 | Lieberman | G06F 17/30731 707/728 |
| 2002/0023091 A1* | 2/2002 | Silberberg | G06F 17/30575 |
| 2002/0173971 A1* | 11/2002 | Stirpe | G06F 17/30867 705/14.53 |
| 2003/0120665 A1* | 6/2003 | Fox | G06F 17/30557 |
| 2003/0126136 A1* | 7/2003 | Omoigui | G06F 17/3089 |
| 2003/0163597 A1* | 8/2003 | Hellman | G06F 17/30557 719/316 |
| 2004/0153456 A1* | 8/2004 | Charnock | G06F 17/30713 |
| 2005/0278309 A1* | 12/2005 | Evans | G06F 17/3087 |
| 2010/0185643 A1* | 7/2010 | Rao | G06F 17/30389 707/759 |
| 2011/0282913 A1 | 11/2011 | Kitamura et al. | |
| 2013/0332145 A1 | 12/2013 | Bostick et al. | |

\* cited by examiner

METHODS FOR RETRIEVING INFORMATION AND DEVICES THEREOF

This application claims the benefit of Indian Patent Application No. 1530/CHE/2014 filed Mar. 24, 2014, which is hereby incorporated by reference in its entirety.

FIELD

This technology generally relates to information retrieval methods and systems and, more particularly, to methods, non-transitory computer readable medium and devices for information retrieval using iterative context enrichment, enterprise ontology, and an enterprise profile and location of a user.

BACKGROUND

Currently, automated information retrieval systems predominantly use either chat-bot techniques or enterprise search systems for processing and executing user queries. Additionally, both chat-bot techniques and enterprise search systems are being used for increasingly disparate needs for retrieval of information. Unfortunately, both also suffer from major limitations and drawbacks which make them cumbersome and inefficient to be used in various real life information retrieval situations.

With respect to chat-bot techniques, typically these techniques process a query from a user to find out a context and then engage the user in a dialogue to get a better understanding of the context (when context is not clear) for retrieving information. Unfortunately, these chat-bot techniques are designed to work with a single context and rely on this dialogue to receive further clarifying inputs from user when the context is not clear. As a result, these techniques are ineffective for retrieving information when a user is interested in multiple contexts and/or when a user does not have the patience, inclination and/or time to answer clarifying questions.

With respect to enterprise search systems, these systems treat each query from a user in isolation and does not maintain any context between queries. As a result, with each subsequent query the user is required to add a condition to the query and the query becomes longer and needs to be rewritten. This is different when compared to asking questions to another human being because human beings can maintain context among the series of queries being asked.

A simple example of this is illustrated with the following example and assumes all data is available to the enterprise search system and the human beings involved with the following sequential queries:
Query 1: How many customers in London?
System response: Number of customers in London.
Human being response: Number of customers in London.
Query 2: How many with age less than 35?
System response: Question not clear.
Human being response: Number of customers in London with age less than 35.
Accordingly, as illustrated in the example above the enterprise search system treats each of the queries, i.e. Query 1 and Query 2, in isolation and as a result is unable to effectively retrieve the requested information in Query 2 without Query 2 being rewritten to include the prior condition from Query 1.

Another problem with chat-bot techniques and enterprise search systems for processing and executing user queries is neither effectively utilizes an enterprise profile of the user in the retrieval of the information. Instead, an enterprise profile of a user is merely used for authorizing viewing of the retrieved information and provides no ranking or shortlisting of results based on what is more relevant for the user based on the enterprise profile.

SUMMARY

A method for retrieving information includes determining, by the information retrieval management computing device, when an identified subject of interest in a received query maps to one of one or more ontology entities. An identification is made, by the information retrieval management computing device, when the identified subject of interest is one of one or more existing subjects of interest when the identified subject of interest is determined to map to one of the ontology entities. One or more filters associated with the identified subject of interest are stored by the information retrieval management computing device. The one or more filters include: one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or the one or more new property conditions and the one or more ontology property conditions when the identified subject of interest is not identified as one of the existing subjects of interest. An updated query is automatically built based on the stored one or more filters by the information retrieval management computing device. One or more results are retrieved and provided, by the information retrieval management computing device, based on the automatically built updated query.

An information retrieval management computing device includes at least one memory coupled to a processor configured to execute programmed instructions stored in the memory including determining when an identified subject of interest in a received query maps to one of one or more ontology entities. An identification is made when the identified subject of interest is one of one or more existing subjects of interest when the identified subject of interest is determined to map to one of the ontology entities. One or more filters associated with the identified subject of interest are stored. The one or more filters include: one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or the one or more new property conditions and the one or more ontology property conditions when the identified subject of interest is not identified as one of the existing subjects of interest. An updated query is automatically built based on the stored one or more filters. One or more results are retrieved and provided based on the automatically built updated query.

A non-transitory computer readable medium having stored thereon instructions for retrieving information comprising executable code which when executed by a processor, causes the processor to perform steps including determining when an identified subject of interest in a received query maps to one of one or more ontology entities. An identification is made when the identified subject of interest is one of one or more existing subjects of interest when the identified subject of interest is determined to map to one of the ontology entities. One or more filters associated with the identified subject of interest are stored. The one or more filters include: one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or the one or more new property conditions and the one or more ontology property conditions when the identified subject of interest is not identified as one of the existing subjects of interest. An updated query is automatically built based on the stored one or more filters. One or more results are retrieved and provided based on the automatically built updated query.

This technology provides methods, non-transitory computer readable, and devices that more effectively and efficiently retrieve information during a series of queries. Additionally, this technology is able to build and execute a search query, without asking any clarifying questions back to the requesting user, through various combinations of iterative context enrichment (based on sequential user inputs), enterprise ontology, enterprise profile and location of a user and similar query histories from other users to retrieve information relevant to the user for the queries. Further, this technology overcomes the prior limitations of chat-bot techniques of restricting the user interaction to a single context and the limitations of enterprise search systems to not be able to maintain the interactive context refinement for the queries.

DETAILED DESCRIPTION

Figure 1:
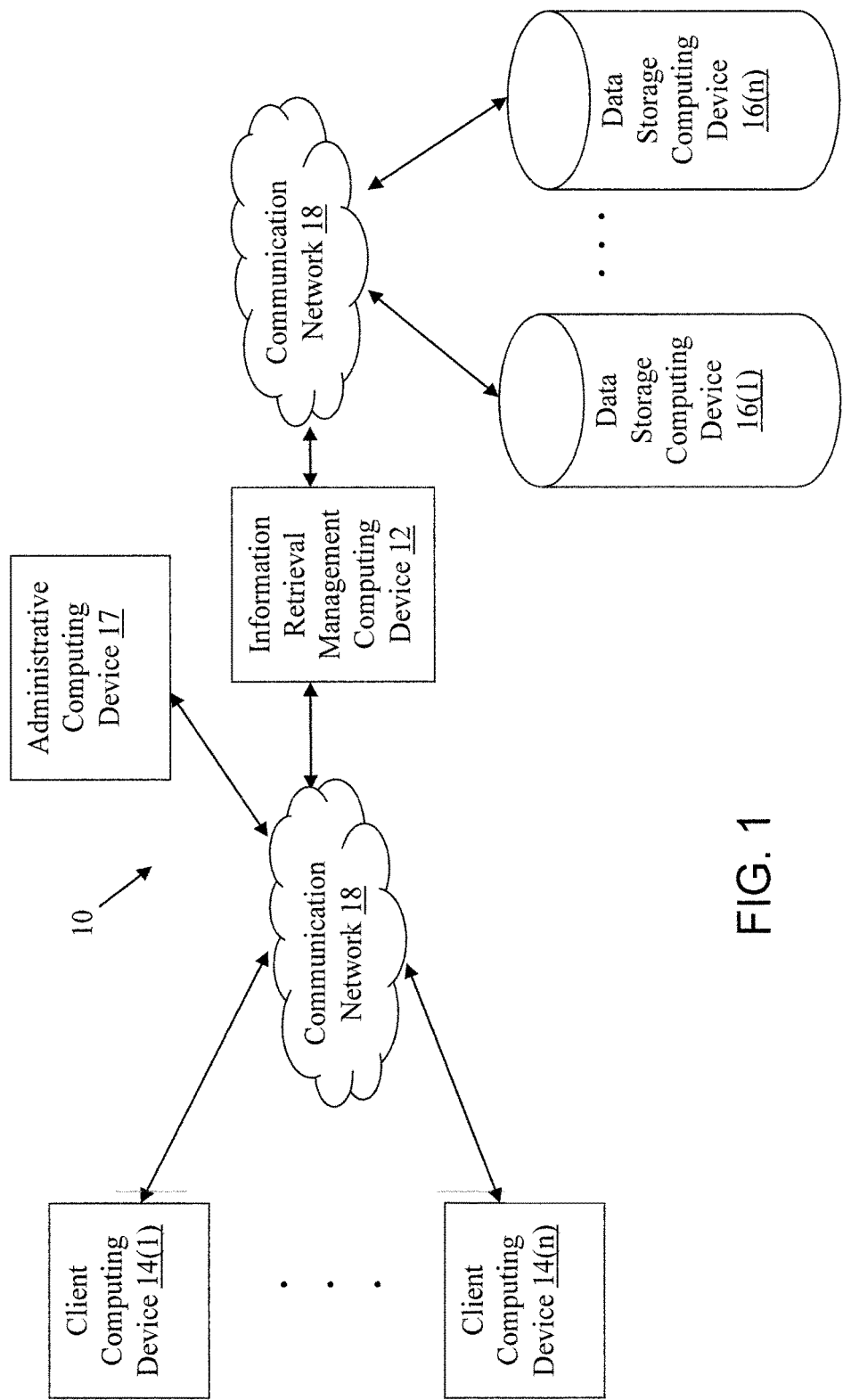
FIG. 1 is a block diagram of an environment with an example of an information retrieval management computing device.
Figure 2:
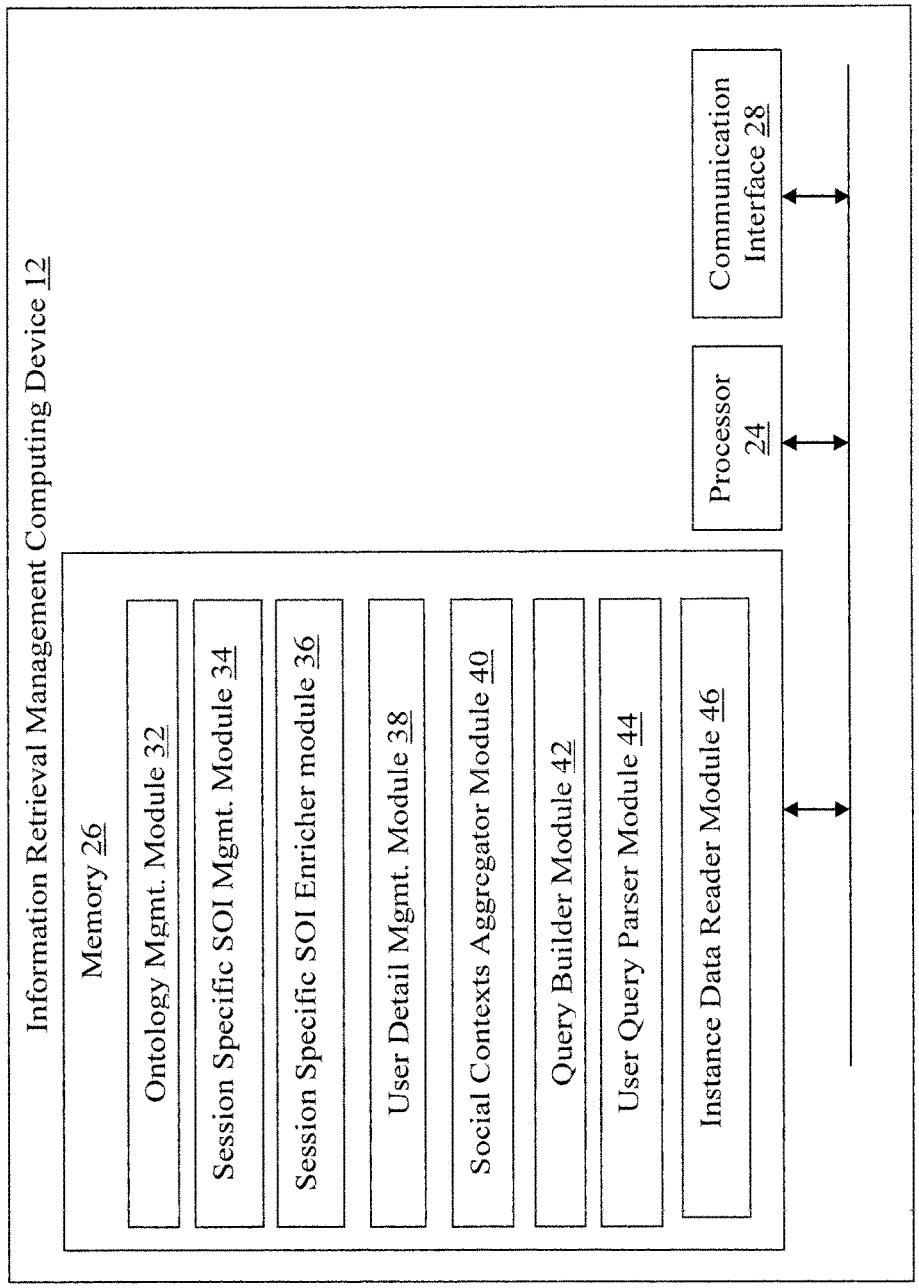
FIG. 2 is a block diagram of the information retrieval management computing device shown in FIG. 1.

An environment 10 with an example of an information retrieval management computing device 12 is illustrated in FIGS. 1 and 2. The environment 10 includes the information retrieval management computing device 12, client computing devices 14($l$)-14($n$), an administrative computing device 17, and data storage devices 16($l$)-16($n$) coupled via one or more communication networks 18, although the environment could include other types and numbers of systems, devices, components, and/or other elements. In this example, the method for prefetching is executed by the information retrieval management computing device 12 although the approaches illustrated and described herein could be executed by other systems and devices. The environment 10 may include other types and numbers of other network elements and devices, such as one or more routers and/or switches by way of example only, as is generally known in the art and will not be illustrated or described herein, although the environment could include other types and numbers of systems, devices, components, and/or other elements in other configurations. This technology provides methods, non-transitory computer readable, and devices that more effectively and efficiently retrieve information during a series of queries.

Referring more specifically to FIGS. 1-2, in this example the information retrieval management computing device 12 includes a processor 24, a memory 26 with a cache 32, and a communication interface 28 which are coupled together by a bus 32, although the information retrieval management computing device 12 may include other types and numbers of elements in other configurations.

The processor 24 of the information retrieval management computing device 12 may execute one or more programmed instructions stored in the memory 26 for combining access history and sequentiality for intelligent prefetching as illustrated and described in the examples herein, although other types and numbers of functions and/or other operation can be performed. The processor 24 of the information retrieval management computing device 12 may include one or more central processing units and/or general purpose processors with one or more processing cores, for example.

The memory 26 of the information retrieval management computing device 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this example, the memory 26 further includes an ontology management module 32, a session specific subject of interest (SoI) management module 34, a session specific subject of interest (SoI) enricher module 36, a user details management module 38, a social contexts aggregator module 40, a query builder module 42, a user query parser module 44, and an instance data reader module 46, although the memory 26 can include other types and numbers of modules, programmed instructions, and/or other data.

In this example, the ontology management module 32 manages creating, updating, reading and/or deleting ontology entities, although the module may perform other types and/or numbers of functions and other operations. The session specific Subject-of-Interest (SoI) management module 34 manages and stores various contexts identified during a session, although the module may perform other types and/or numbers of functions and other operations. The session specific Subject-of-Interest (SoI) enricher module 36 enriches the various contexts identified during the session and uses the enriched contexts to retrieve results for queries, although the module may perform other types and/or numbers of functions and other operations. The user details management module 38 manages accessing the current user's enterprise profile and other details, such as enterprise details, location, and history, although the module may perform other types and/or numbers of functions and other operations. The social contexts aggregator module manages accessing and updating the context history of similar users, e.g. users with the same enterprise role, designation, and/or location by way of example, although the module may perform other types and/or numbers of functions and other operations. The query builder module 42 takes into account other similar enterprise user's enterprise profiles and past queries to enrich contexts, acts as a controller for other modules, and builds queries to be run on enterprise sources, although the module may perform other types and/or numbers of functions and other operations. The user query parser module is a natural language processing module for parsing user's query and identifying terms, although the module may use other parsing approaches and may perform other types and/or numbers of functions and other operations. The instance data reader module reads and manages instance data, although the module may perform other types and/or numbers of functions and other operations.

The communication interface 28 of the information retrieval management computing device 12 operatively couples and communicates between the traffic management device 12, the client computing devices **14(*l*)-14(*n*), and data storage computing devices 16(*l*)-16(*n*), which are all coupled together by the communication networks 18, although other types and numbers of communication networks or systems with other types and numbers of connections and configurations to other devices and elements. By way of example only, the communication networks 18 can use TCP/IP over Ethernet and industry-standard protocols, including NFS, CIFS, SOAP, XML, LDAP, and SNMP, although other types and numbers of communication networks, can be used. The communication networks 18** in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this example, each of the client computing devices **14(*l*)-14(*n*) and each of the data storage computing devices 16(*l*)-16(*n*) includes a processor, a memory, and a communication interface, which are coupled together by a bus or other link, although other numbers and types of devices and/or nodes as well as other network elements could be used. The client computing devices 14(*l*)-14(*n*) may run applications that may provide an interface to make requests for and receive content, such as data blocks, web pages, applications, and/or other information hosted by one or more of the data storage computing devices 16(*l*)-16(*n*)** or other storage media.

The data storage computing devices **16(*l*)-16(*n*) may store and provide content or other network resources in response to requests from the client computing devices 14(*l*)-14(*n*) via the communication networks 18, for example, although other types and numbers of storage media in other configurations could be used. In particular, the data storage computing devices 16(*l*)-16(*n*) may each comprise various combinations and types of storage hardware and/or software and represent a system with multiple data storage computing devices in a data storage pool, which may include internal or external networks. Various network processing applications, such as CIFS applications, NFS applications, HTTP Web Data storage computing device applications, and/or FTP applications, may be operating on the data storage computing devices 16(*l*)-16(*n*) and transmitting data (e.g., files or web pages) in response to requests from the client computing devices 14(*l*)-14(*n*)**.

The administrative computing device 17 includes a processor, a memory, and a communication interface, which are coupled together by a bus or other link, although other numbers and types of devices and/or nodes as well as other network elements could be used.

Although the exemplary network environment 10 with the traffic management device 12, client computing devices **14(*l*)-14(*n*), data storage computing devices 16(*l*)-16(*n*), administrative computing device 17, and communication networks 18** are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
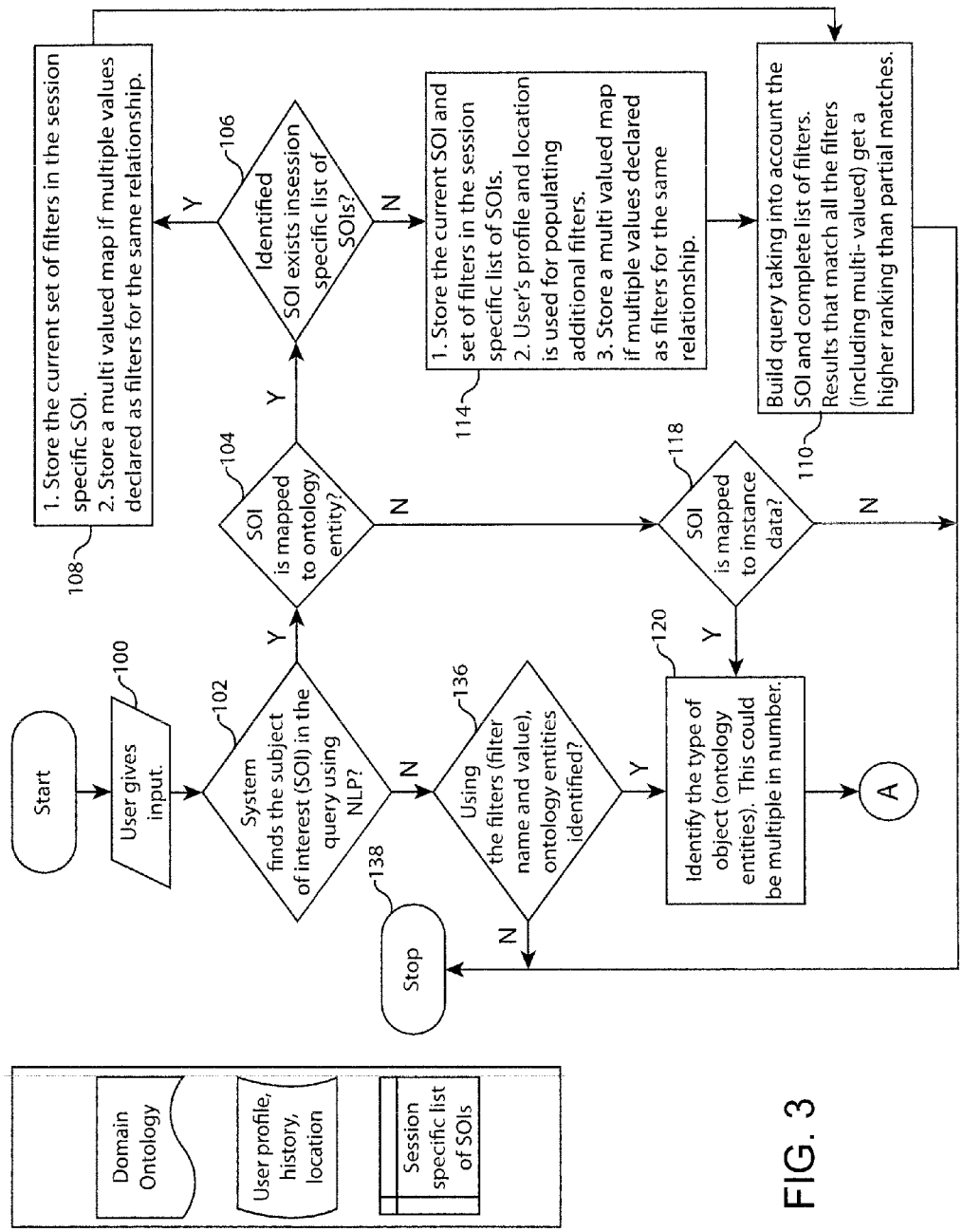
FIG. 3 is a flow chart of an example of a method for information retrieval using iterative context enrichment, enterprise ontology, and an enterprise profile and location of a user.
Figure 3:
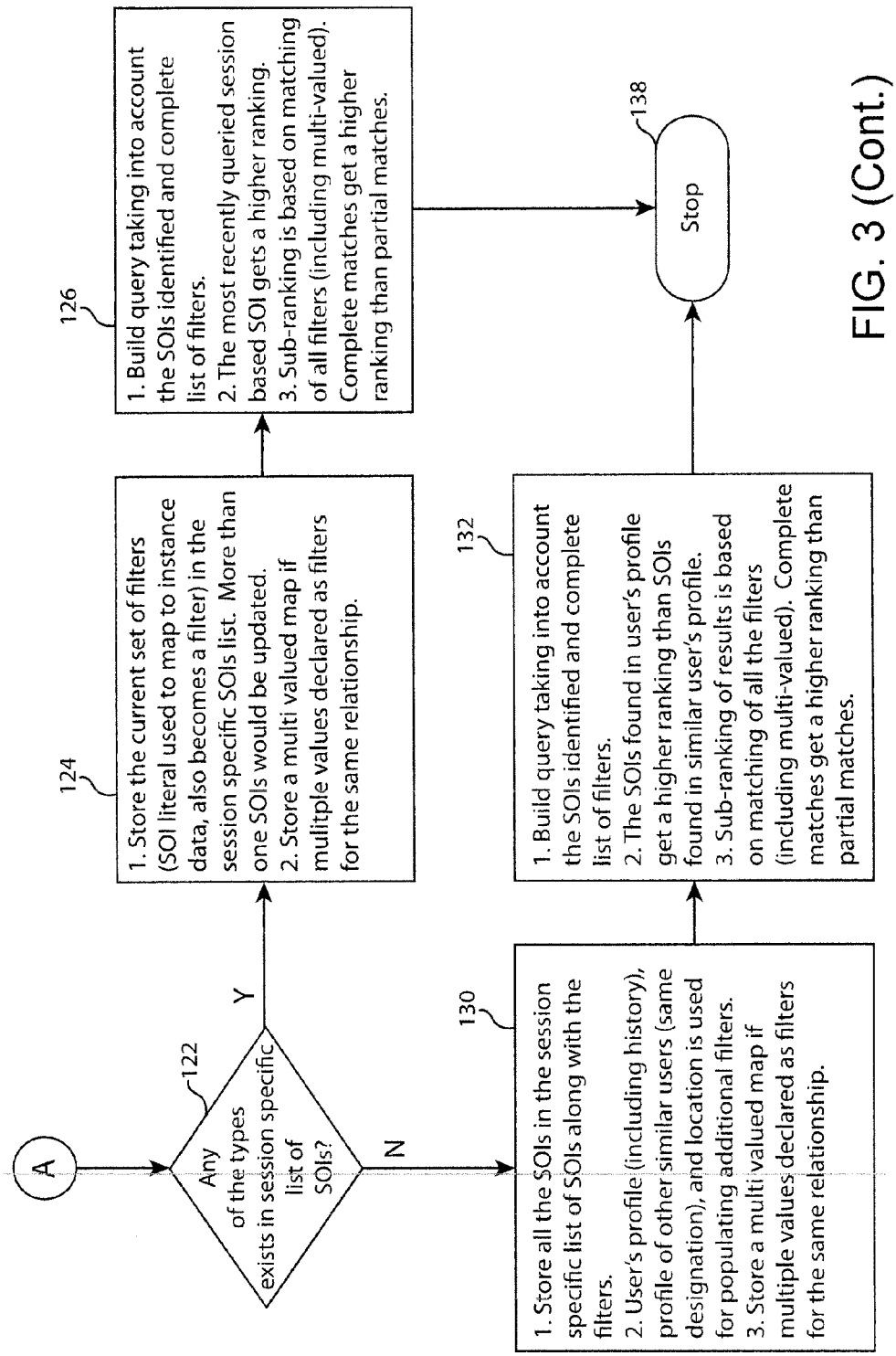

An example of a method for information retrieval using iterative context enrichment, enterprise ontology, and an enterprise profile and location of a user will now be described with reference to FIGS. 1-3. In step 100, after the method starts the information retrieval management computing device 12 executes the query parser module 44 to parse the query from a user at one of the client computing devices **14(*l*)-14(*n*)**. This parsing gives a list of terms, such as a subject of interest and/or one or more property conditions, such as a data property condition and/or an object property condition.

In step 102, the information retrieval management computing device 12 determines if a subject of interest (SoI) was identified by the parsing, although other manners for determining if a subject of interest was identified could be used. By way of example only, the information retrieval management computing device 12 may use a natural language parser comprising programmed instructions to parse a received query to identify a subject of interest (SoI), although other types and/or numbers of approaches to parse or otherwise identify a subject of interest (SoI) could be used. If the information retrieval management computing device 12 determines a subject of interest was identified, then the Yes branch is taken to step 104.

In step 104, the information retrieval management computing device 12 executes the ontology management module 32 to determine if the identified subject of interest is mapped to one of one or more stored ontology entities. In this example, the subject of interest (SoI) identified from the query is matched with one of the one or more ontology entities by the information retrieval management computing device 12 using string matching, although other types and/or numbers of approaches could be used. For example, if a "customer" SoI would match with an ontology entity http://dbp.org#Customer. The ontology entity can also have a list of similar names (morphological variations) which are associated with the ontology entity in a stored memory in or accessible by the information retrieval management computing device 12. If any of these names occur as the SoI, then the SoI can be mapped by the information retrieval management computing device 12. As an example, "Purchaser" can be mapped to http://dbp.org#Customer if "Purchaser" was mentioned as an alias for Customer entity in the ontology entity.

If the information retrieval management computing device 12 determines the identified subject of interest is mapped to one of one or more of the stored ontology entities, then the Yes branch is taken to step 106. In step 106, the information retrieval management computing device 12 executes the session specific subject of interest management module 34 to determine if the identified subject of interest exists in a session specific list of one or more existing subject of interests. In this example, the information retrieval management computing device 12 by the information retrieval management computing device 12 determines if the identified subject of interest exists in a session specific list of one or more existing subject of interests using string matching, although other types and/or numbers of approaches could be used. By way of example only, if the ontology entity http://dbp.org#Customer has been identified by the information retrieval management computing device 12 as the ontology entity mapped to the SoI in the received query from one of the client computing devices 14(l)-14(n), then the information retrieval management computing device 12 will now iterate over a list of stored session specific list of subjects of interest SoIs, and do a string comparison. If the ontology entity http://dbp.org#Customer mapped to the SoI in the received query exists as one of the ontology entities mapped to one of the stored session specific SoI list, then the information retrieval management computing device 12 has determined that the identified subject of interest exists in the session specific list of subject of interests. If the information retrieval management computing device 12 determines the identified subject of interest exists in a session specific list of subject of interests, then the Yes branch is taken to step 108.

In step 108, the information retrieval management computing device 12 executes the ontology management module 32, the session specific subject of interest management module 34 and the session specific subject of interest enricher module 36 to identify one or more filters comprising one or more new property conditions identified in the received query, one or more ontology property conditions associated with the one of the ontology entities mapped to the identified subject of interest, and one or more existing property conditions associated with the one of the one or more existing subjects of interest matched to the identified subject of interest. Next, the information retrieval management computing device 12 stores the one or more filters associated with the identified subject of interest with the one or more existing subjects of interest previously stored with one or more identified filters. Additionally, the information retrieval management computing device 12 resolves and stores a multi valued map if multiple condition values are associated with the same property condition.

In step 110, the information retrieval management computing device 12 executes the query builder module 42 to automatically build a query, without intervention from a user at one of the client computing devices 14(l)-14(n), taking into account the identified subject of interest and the stored one or more filters associated with the identified subject of interest. By way of example only, the information retrieval management computing device 12 may use a query builder comprising programmed instructions to build a query taking into account the identified subject of interest and the stored one or more filters associated with the identified subject of interest, although other types and/or numbers of approaches to build a query could be used.

Additionally, the information retrieval management computing device 12 may rank the results of the responses to the built query from one or more of the data storage computing devices 16(l)-16(n) before providing the results. In this example, the results may be ranked by the information retrieval management computing device 12 based on how many matches for the one or more stored property conditions, including any multi-value conditions, for the existing subject of interest are found. In this example, results with more matches get a higher ranking by the information retrieval management computing device 12 than partial matches. Once step 110 is completed, the information retrieval management computing device 12 proceeds to step 138 where this example of the method may end.

If back in step 106 the information retrieval management computing device 12 determines the identified subject of interest does not exist in a session specific list of subject of interests, then the No branch is taken to step 114. In step 114, the information retrieval management computing device 12 executes the ontology management module 32, the session specific subject of interest management module 34, the session specific subject of interest enricher module 36, and the user details management module 38 to identify one or more filters comprising one or more new property conditions identified in the received query and one or more ontology property conditions associated with the one of the ontology entities mapped to the identified subject of interest. Next, the information retrieval management computing device 12 stores the one or more filters associated with the identified subject of interest with the one or more existing subjects of interest previously stored with one or more identified filters. Additionally, the information retrieval management computing device 12 resolves and stores a multi valued map if multiple condition values are associated with the same property condition. Further, the information retrieval management computing device 12 may obtain and an enterprise profile of the user at the one of the client computing devices 14(l)-14(n) from the administrative device 17 at an enterprise, by way of example. The enterprise profile may include information, such as a role, designation, and/or location of the user. The information retrieval management computing device 12 may use the enterprise profile to generate one or more additional property conditions which also are stored as filters with the identified subject of interest. Once step 114 is completed, the information retrieval management computing device 12 proceeds to step 110 described earlier.

If back in step 104 the information retrieval management computing device 12 determines the identified subject of interest is not mapped to one of one or more of the stored ontology entities, then the No branch is taken to step 118. In step 118, the information retrieval management computing device 12 executes the instance data reader module 46 to determine if the identified subject of interest is mapped to instance data. By way of example only, if the received from one of the client computing devices 14(l)-14(n) was, "How many John in London", then back in step 102, the information retrieval management computing device 12 would parse this query and identify the subject of interest (SoI) as "John". However, in this example in step 104 the information retrieval management computing device 12 determines that "John" is not one of the current ontology entities. In this case, the instance data may be used by the information retrieval management computing device 12 to figure out what "John" means. In this example, the information retrieval management computing device 12 may determine the subject of interest "John" is an http:// dbp.org#First_Name that is a data attribute belonging to data attributes http://dbp.org#Customer and http:// dbp.org#Employee based on stored attribute relationships. As a result, "John" gets mapped to http:// dbp.org#First_Name by the information retrieval management computing device 12 and this information is used in step 120, to determine Employee and Customer connections based on the identified related attributes. Although one example of determining if the identified subject of interest is mapped to instance data is described herein, other types and/or numbers of approaches could be used.

Accordingly, if in step 118 the information retrieval management computing device 12 determines the identified subject of interest is mapped to instance data, then the Yes branch is taken to step 120. If in step 118 the information retrieval management computing device 12 determines the subject of interest is not mapped to an instance data, then the No branch is taken to step 138 where this example of the method may end.

In step 120 when the identified subject of interest is mapped to instance data, then the information retrieval management computing device 12 executes the ontology management module 32 to identify the one or more ontology entities which matched the instance data. Additionally, in this step the information retrieval management computing device 12 may also execute the ontology management module 32 to identify the one or more ontology entities which matched the identified one or more property conditions parsed from the received query. In this example, the one or more ontology entities which match the instance data and the one or more ontology entities which matched the identified one or more property conditions parsed from the received query may be identified by the information retrieval management computing device 12 using string matching, although other types and/or numbers of approaches could be used for either one.

In step 122 the information retrieval management computing device 12 executes the session specific subject of interest management module 34 to determine if any of the identified one or more ontology entities from step 120 match one of the existing subjects of interest. In this example, the information retrieval management computing device 12 uses string matching to determine if any of the identified one or more ontology entities from step 120 match one of the existing subjects of interest, although other types and/or numbers of approaches could be used. If the information retrieval management computing device 12 determines one or more the identified ontology entities match one of the existing subjects of interest, then the Yes branch is taken to step 124.

In step 124, the information retrieval management computing device 12 executes the ontology management module 32, the session specific subject of interest management module 34 and the session specific subject of interest enricher module 36 to resolve the one or more property conditions against the one or more types of ontology entities. In this example, the information retrieval management computing device identifies one or more ontology property conditions associated with the one or more of the ontology entities that match the at least one instance in the database mapped to the identified subject of interest. Additionally, the information retrieval management computing device stores one or more filters comprising the one or more ontology property conditions associated with the one or more of the ontology entities that match the at least one instance in the database mapped to the identified subject of interest. Further, the information retrieval management computing device 12 resolves and stores a multi valued map if multiple condition values are associated with the same property condition.

In step 126, the information retrieval management computing device 12 executes the query builder module 42 to automatically build a query, without intervention from a user at one of the client computing devices 14(l)-14(n), taking into account the identified one or more ontology entities and the stored one or more filters for the identified one or more ontology entities. Additionally, the information retrieval management computing device 12 may rank the results of the responses to the built query from one or more of the data storage computing devices 16(l)-16(n) before providing the results. In this example, the results may be ranked by the information retrieval management computing device 12 based on how matches for the one or more stored property conditions, including any multi-value conditions, for the existing subject of interest are found and those results with more matches get a higher ranking by the information retrieval management computing device 12 than partial matches. Further, the results may be ranked by the information retrieval management computing device 12 by taking into the most recently queried one of the identified one or more ontology entities. Even further, the information retrieval management computing device 12 may generate one or more sub-rankings based on how many of the property conditions, including any property conditions with multi-values, are matched. Once completed, the information retrieval management computing device 12 proceeds to step 138 where this example of the method may end.

If back in step 122 the information retrieval management computing device 12 determines none of the identified one or more ontology entities match any of the existing subjects of interest, then the No branch is taken to step 130. In step 130, the information retrieval management computing device 12 executes the ontology management module 32, the session specific subject of interest management module 34, the session specific subject of interest enricher module 36, the user details management module 38, and the social contexts aggregator module 40 to resolve the property conditions against the ontology entity. In this example, the information retrieval management computing device 12 obtains an enterprise profile of a user at one of the client computing devices 14(l)-14(n) associated with the received query and of one or more other users with at least one matching designation, such as role, designation and/or location by way of example only, from the administrative computing device 17 in this example. The information retrieval management computing device 12 obtains one or more ontology property conditions associated with the identified one or more of the ontology entities that match the at least one of the new property conditions and one or more additional property conditions based on the obtained enterprise profiles. Additionally, the information retrieval management computing device 12 stores one or more filters comprising the one or more ontology property conditions associated with the identified one or more of the ontology entities that match the at least one of the new property conditions and the identified one or more additional property conditions with the one or more of the ontology entities that match the at least one of the new property conditions as one or more new subjects of interest. Further, the information retrieval management computing device 12 resolves and stores a multi valued map if multiple condition values are associated with the same property condition.

In step 132, the information retrieval management computing device 12 stores executes the query builder module 42 to automatically build a query, without intervention from a user at one of the client computing devices 14(*l*)-14(*n*), taking into account the identified one or more ontology entities and the stored one or more filters for the identified one or more ontology entities. Additionally, the information retrieval management computing device 12 may rank the results of the responses to the built query from one or more of the data storage computing devices 16(*l*)-16(*n*) before providing the results. In this example, the results may be ranked by the information retrieval management computing device 12 based on how matches for the one or more stored property conditions, including any multi-value conditions, for the existing subject of interest are found and those results with more matches get a higher ranking by the information retrieval management computing device 12 than partial matches. Further, the results may be ranked by the information retrieval management computing device 12 by taking into account and assigning a higher value to any one of the identified one or more ontology entities associated with the user at the one of the client computing device 14(*l*)-14(*n*) that provided the query. Even further, the information retrieval management computing device 12 may generate one or more sub-rankings based on how many of the property conditions, including any property conditions with multi-values, are matched. Once completed, the information retrieval management computing device 12 proceeds to step 138 where this example of the method may end.

If back in step 102, the information retrieval management computing device 12 determines a subject of interest is not identified, then the No branch is taken to step 136. In step 136, the information retrieval management computing device 12 executes the ontology management module 32 to determine if any of the new property conditions match any of the one or more ontology entities. If any of the new property conditions match any of the one or more ontology entities, then the Yes branch is taken back to step 120. If any of the new property conditions do not match any of the one or more ontology entities, then the No branch is taken back to step 138 where this example of the method may end.

Accordingly, as illustrated and described with the examples herein, with this technology since the context is automatically captured, a user need only mention the new property condition in a query and the new property condition will be appended to the query with the appropriate known context. As a result, a user can interact with this technology maintaining multiple contexts during a session instead of a single context and with requiring a user to answer clarifying questions. This technology utilizes a combination of iterative context enrichment (based on sequential user inputs), enterprise ontology, user's enterprise profile and location and/or similar users' query history to retrieve relevant information relevant to the user and his current subject of interest. Further, this technology is above to identify, resolve, retrieve and maintain multiple contexts utilizing a combination of iterative context enrichment based on sequential user inputs, enterprise ontology, user's enterprise profile and location, and/or similar users' query history to build and execute relevant queries

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for retrieving information, the method comprising:
   parsing, by an information retrieval management computing device, a received query to identify a subject of interest;
   determining, by the information retrieval management computing device, when the identified subject of interest has been identified by the parsing;
   determining, by the information retrieval management computing device, when the identified subject of interest in the received query maps to one of one or more ontology entities when the identified subject of interest has been determined to be identified by the parsing;
   identifying, by the information retrieval management computing device, when the identified subject of interest is one of one or more existing subjects of interest when the identified subject of interest is determined to map to one of the ontology entities;
   storing associated with the identified subject of interest, by the information retrieval management computing device, one or more filters comprising:
      one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or
      the one or more new property conditions and the one or more ontology property conditions when the identified subject of interest is not identified as one of the existing subjects of interest;
   automatically building, by the information retrieval management computing device, an updated query based on the stored one or more filters; and
   retrieving and providing, by the information retrieval management computing device, one or more results based on the automatically built updated query.

2. The method as set forth in claim 1 further comprising:
   obtaining, by the information retrieval management computing device, an enterprise profile of a user associated with the received query when the identified subject of interest is not identified as one of the existing subjects of interest; and
   identifying, by the information retrieval management computing device, one or more additional property conditions based on the obtained enterprise profile of the user;
   wherein the storing further comprises storing, by the information retrieval management computing device, the one or more filters further comprising the identified one or more additional property conditions.

3. The method as set forth in claim 2 wherein the identifying the one or more additional property conditions is further based on a location of the user associated with the received query.

4. The method as set forth in claim 1 further comprising:

parsing, by an information retrieval management computing device, the received query to identify one or more new property conditions.

5. The method as set forth in claim 4 further comprising:

determining, by the information retrieval management computing device, when one or more of the ontology entities match the at least one of the new property conditions identified in the received query when the identified subject of interest has not been determined to be identified by the parsing; and identifying, by the information retrieval management computing device, the one or more of the ontology entities that match the at least one of the new property conditions when the determining indicates the one or more of the ontology entities match the at least one of the new property conditions.

6. The method as set forth in claim 5 further comprising:

determining, by the information retrieval management computing device, when the identified one or more of the ontology entities that match the at least one of the new property conditions match one of the existing subjects of interest;

obtaining, by the information retrieval management computing device, enterprise profile of a user associated with the received query and of one or more other users with at least one matching designation when the determining indicates the identified one or more of the ontology entities do not match one of the existing subjects of interest; and identifying, by the information retrieval management computing device, one or more ontology property conditions associated with the identified one or more of the ontology entities that match the at least one of the new property conditions and one or more additional property conditions based on the obtained enterprise profiles;

wherein the storing further comprises storing, by the information retrieval management computing device, the one or more filters further comprising the one or more ontology property conditions associated with the identified one or more of the ontology entities that match the at least one of the new property conditions and the identified one or more additional property conditions with the one or more of the ontology entities that match the at least one of the new property conditions as one or more new subjects of interest.

7. The method as set forth in claim 4 further comprising:

determining, by the information retrieval management computing device, when the identified subject of interest maps to at least one instance in a database when the identified subject of interest is determined not to map to one of one or more ontology entities; and identifying, by the information retrieval management computing device, the one or more of the ontology entities that match the at least one instance in the database mapped to the identified subject of interest when the identified subject of interest is determined to map to the at least one instance in the database.

8. The method as set forth in claim 7 further comprising:

determining, by the information retrieval management computing device, when the identified one or more of the ontology entities match one of the existing subjects of interest; and identifying, by the information retrieval management computing device, one or more ontology property conditions associated with the one or more of the ontology entities that match the at least one instance in the database mapped to the identified subject of interest;

wherein the storing further comprises storing, by the information retrieval management computing device, the one or more filters further comprising the one or more ontology property conditions associated with the one or more of the ontology entities that match the at least one instance in the database mapped to the identified subject of interest.

9. An information retrieval management computing device comprising:

at least one processor;

at least one memory coupled to the processor configured to execute programmed instructions stored in the memory comprising:

parsing a received query to identify a subject of interest;

determining when the identified subject of interest has been identified by the parsing;

determining when the identified subject of interest in the received query maps to one of one or more ontology entities when the identified subject of interest has been determined to be identified by the parsing;

identifying when the identified subject of interest is one of one or more existing subjects of interest when the identified subject of interest is determined to map to one of the ontology entities;

storing associated with the identified subject of interest one or more filters comprising:

one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or the one or more new property conditions and the one or more ontology property conditions when the identified subject of interest is not identified as one of the existing subjects of interest;

automatically building an updated query based on the stored one or more filters; and retrieving and providing one or more results based on the automatically built updated query.

10. The device as set forth in claim 9 wherein the processor is configured to execute programmed instructions stored in the memory further comprising:

obtaining an enterprise profile of a user associated with the received query when the identified subject of interest is not identified as one of the existing subjects of interest; and identifying one or more additional property conditions based on the obtained enterprise profile of the user;

wherein the storing further comprises storing the one or more filters further comprising the identified one or more additional property conditions.

11. The device as set forth in claim 9 wherein the processor is configured to execute programmed instructions stored in the memory for the identifying to identify the one or more additional property conditions further based on a location of the user associated with the received query.

12. The device as set forth in claim 9 wherein the processor is configured to execute programmed instructions stored in the memory further comprising:
parsing the received query to identify one or more new property conditions.

13. The device as set forth in claim 12 wherein the processor is further configured to execute programmed instructions stored in the memory further comprising:
determining when one or more of the ontology entities match the at least one of the new property conditions identified in the received query when the identified subject of interest has not been determined to be identified by the parsing; and
identifying the one or more of the ontology entities that match the at least one of the new property conditions when the determining indicates the one or more of the ontology entities match the at least one of the new property conditions.

14. The device as set forth in claim 13 wherein the processor is further configured to execute programmed instructions stored in the memory further comprising:
determining when the identified one or more of the ontology entities that match the at least one of the new property conditions match one of the existing subjects of interest;
obtaining enterprise profile of a user associated with the received query and of one or more other users with at least one matching designation when the determining indicates the identified one or more of the ontology entities do not match one of the existing subjects of interest; and
identifying one or more ontology property conditions associated with the identified one or more of the ontology entities that match the at least one of the new property conditions and one or more additional property conditions based on the obtained enterprise profiles;
wherein the storing further comprises storing the one or more filters further comprising the one or more ontology property conditions associated with the identified one or more of the ontology entities that match the at least one of the new property conditions and the identified one or more additional property conditions with the one or more of the ontology entities that match the at least one of the new property conditions as one or more new subjects of interest.

15. The device as set forth in claim 12 further comprising:
determining when the identified subject of interest maps to at least one instance in a database when the identified subject of interest is determined not to map to one of one or more ontology entities; and
identifying the one or more of the ontology entities that match the at least one instance in the database mapped to the identified subject of interest when the identified subject of interest is determined to map to the at least one instance in the database.

16. The device as set forth in claim 15 wherein the processor is further configured to execute programmed instructions stored in the memory further comprising:
determining when the identified one or more of the ontology entities match one of the existing subjects of interest; and
identifying one or more ontology property conditions associated with the one or more of the ontology entities that match the at least one instance in the database mapped to the identified subject of interest;
wherein the storing further comprises storing the one or more filters further comprising the one or more ontology property conditions associated with the one or more of the ontology entities that match the at least one instance in the database mapped to the identified subject of interest.

17. A non-transitory computer readable medium having stored thereon instructions for retrieving information comprising executable code which when executed by a processor, causes the processor to perform steps comprising:
parsing a received query to identify a subject of interest;
determining when the identified subject of interest has been identified by the parsing;
determining when the identified subject of interest in the received query maps to one of one or more ontology entities when the identified subject of interest has been determined to be identified by the parsing;
identifying when the identified subject of interest is one of one or more existing subjects of interest when the identified subject of interest is determined to map to one of the ontology entities;
storing associated with the identified subject of interest one or more filters comprising:
one or more new property conditions in the received query, one or more ontology property conditions associated with the mapped one of the ontology entities, and one or more existing property conditions associated with the one of the one or more existing subjects of interest when the identified subject of interest is identified as one of the existing subjects of interest; or
the one or more new property conditions and the one or more ontology property conditions when the identified subject of interest is not identified as one of the existing subjects of interest;
automatically building an updated query based on the stored one or more filters; and
retrieving and providing one or more results based on the automatically built updated query.

* * * * *